United States Patent [19]

Morris

[11] Patent Number: 4,606,774

[45] Date of Patent: Aug. 19, 1986

[54] PROCESS FOR REMOVING CONTAMINANTS FROM SOILS

[75] Inventor: Thomas E. Morris, Lake Jackson, Tex.

[73] Assignee: The Dow Chemical Company, Midland, Mich.

[21] Appl. No.: 635,865

[22] Filed: Jul. 30, 1984

[51] Int. Cl.$^4$ .............................................. B08B 3/10
[52] U.S. Cl. ........................................ 134/10; 134/12; 134/25.5; 210/769; 210/774; 210/805; 210/806
[58] Field of Search ................ 134/10, 12, 25.1, 25.5; 210/774, 769, 770, 806, 805

[56] References Cited

U.S. PATENT DOCUMENTS

| | | | |
|---|---|---|---|
| 2,709,674 | 5/1955 | Bergstrom | 134/12 X |
| 2,973,312 | 2/1961 | Logan | 134/25.5 X |
| 3,017,342 | 1/1962 | Bulat et al. | 134/25.1 X |
| 3,072,567 | 1/1963 | Evans et al. | 134/25.5 X |
| 3,610,260 | 10/1971 | Kearney | 134/12 |
| 4,040,866 | 8/1977 | Mondshine | 175/206 X |
| 4,091,826 | 5/1978 | Bahrke | 134/25.5 X |
| 4,139,462 | 2/1979 | Sample | 175/66 X |
| 4,406,796 | 9/1983 | Duval | 134/12 X |
| 4,424,081 | 1/1984 | Giguere | 134/25.1 X |

*Primary Examiner*—Benoît Castel
*Attorney, Agent, or Firm*—Glwynn R. Baker

[57] ABSTRACT

There is described a process in which a contaminated soil is freed of its contaminants and the solvent used to free and wash the contaminated soil is collected and reused and/or it is combusted and removed from the system in a form which will not contaminate the ambient atmosphere. All portions of this equipment are substantially gas tight and liquid tight and therefore eliminate or markedly reduce any further contamination of the ambient atmosphere with the contaminants found in the soil.

2 Claims, 1 Drawing Figure

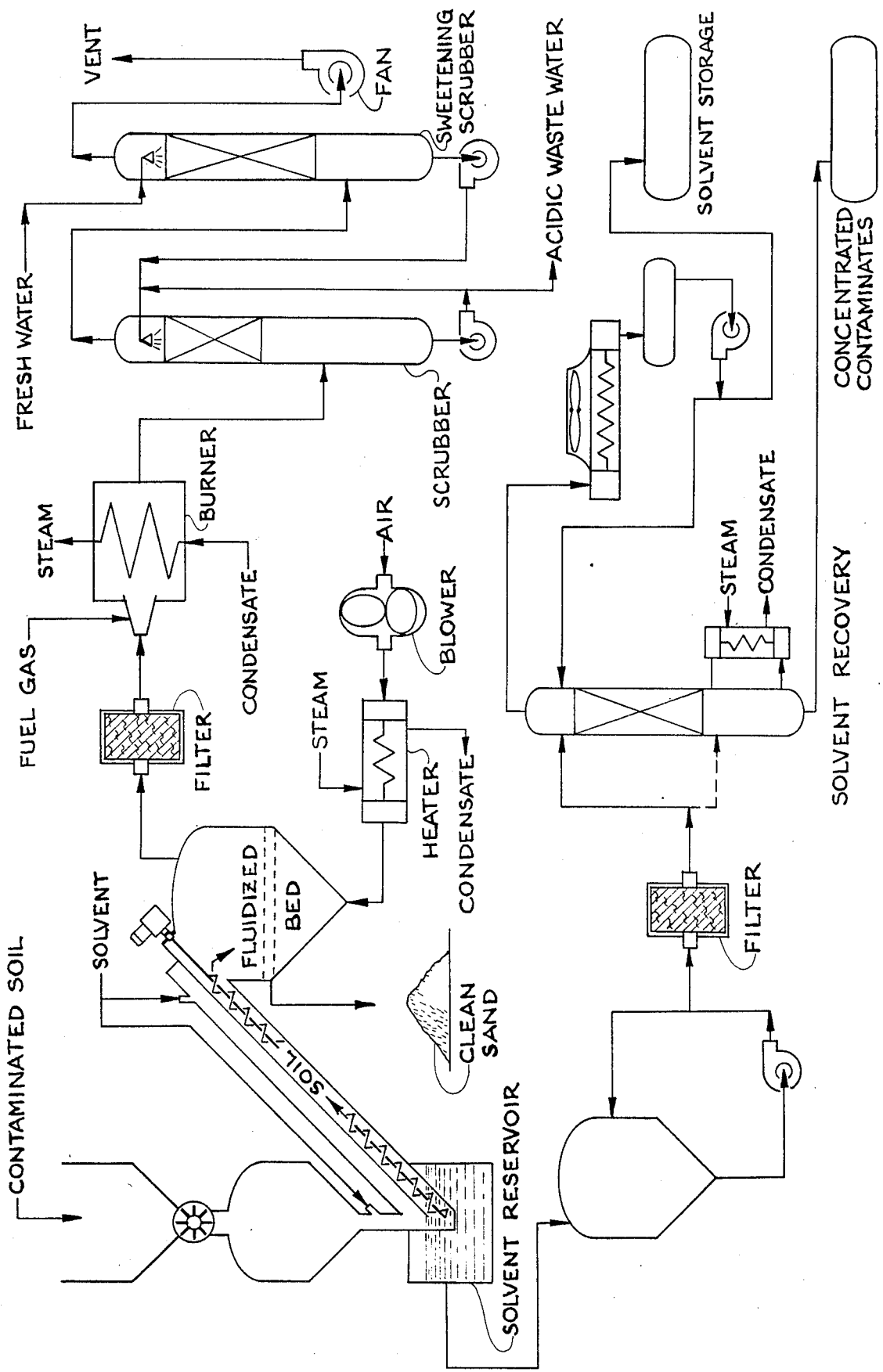

PROCESS FOR REMOVING CONTAMINANTS FROM SOILS

BRIEF DESCRIPTION OF THE INVENTION

The present invention constitutes a process for decontaminating soil in the substantial location where the soil in its contaminated form is found. The process comprises contacting the contaminated soil with a solvent, as for example, a halogenated hydrocarbon solvent for the contaminant, in a manner such as to intimately mix the contaminant in the soil with the solvent. This mixture is then treated in a manner to separate the soil from the bulk of the solvent producing the solvent wet substantially contaminant free solid soil and a dirty, or contaminated solvent fraction. The soil wet with the solvent is freed of the solvent by passing hot air or other inert gas through the body of the solvent wet soil and recovering the air-solvent vapor mixture from the treating zone. The substantially solvent free and decontaminated soil is removed from the treater and can be used to replace the soil that has been removed thereby eliminating the hauling of large quantities of soil from one place to another to be treated and reducing the hazard of spills of contaminated soils during the transportation process. The solvent vapors and the air or other inert gas from the dryer are passed through a filter and then burned in a burner or incinerator to substantially free the inorganic oxide of any inorganic material which passed with the solvent vapors, this would be a negligible volume, and to produce the combustion gases of the organic solvent and if a chlorinated solvent the hydrochloride of the chlorinated solvent, for example. The hot gases from the incinerator or burner are quenched and then passed to an absorber wherein any acids are collected as an aqueous acid solution which can be neutralized on site with, for example, an alkali such as calcium carbonate or caustic soda. The nonabsorbed gases from the combustion chamber are basically CO, $CO_2$ and nitrogen and these are passed to a vent to the atmosphere. The solvent which has been collected from the initial contacting of the soil is collected and passed through filters to remove any solid matter which may have been carried with the solvent from the contacting zone. These solids are collected and stripped of the residual solvent in a similar manner as the major portion of the soil was treated to remove the residual solvent from it, that is to say that the solids are treated with a hot air stream or other inert gas and the solvent/air mixture is passed to the burner. Alternatively, the solvent air mixture may be passed to the solvent distillation column and stripped of the solvent through the condensing system of that column. The bulk of the solvent, or filtrate from the filters, is passed through a distillation column wherein the minute or micro solids which pass through the filter are removed and the solvent taken overhead along with any potential vaporizable contaminant and, upon condensation, this solvent is reused in the initial contacting thereby completing the loop of contaminant to prevent it from entering the atmosphere. The contaminants which have been collected from the filters are of a small volume and can be retained in contaminant type containers, that is to say that the filters can be slipped from the filter mechanism into a holder in which no outside contact or association with the outside ambient atmosphere is had. Thus we have reduced the amount of material which needs to be transported and processed to its smallest practical modicum.

The contaminant, of course, can be any material, organic or inorganic, which has some degree of solubility in the solvent. Since the solvent is maintained substantially in a closed loop and any vaporizable contaminants are contained within the loop, the contaminants and the solvent are eventually combined in the burner to their elemental or simplest form of oxidized state. That is to say, the chlorine associated with a chlorinated hydrocarbon is oxidized to produce HCl and $CO_2$ and traces of CO and water. The contaminants, if they have an organic substituant or constitution are likewise combusted to $CO_2$ and trace CO and water and any of the acidic components such as chlorine, thereby producing HCl, or other washable or recoverable gases $SO_2$ and the like.

The solvents which can be employed in accordance with the present invention are substantially any organic solvent which is vaporizable at a reasonable temperature below about 200° C. such that hot air or other inert gas can be used to strip the solvent from the mass of the washed soil. The chlorinated hydrocarbons are particularly useful in this respect. However, other organic solvents may be employed in the practice of the present invention if they have a particular solvency for the specific contaminant which is to be removed from the soil. Thus hydrocarbons, ketones, and organic acids may be employed and since these materials are maintained within a closed loop there is little opportunity for their contamination of the atmosphere.

The apparatus for carrying out the present invention of course may be varied considerably depending upon the extent of the operation to be carried out. Conveniently, however, it is the intent of the present invention to establish and provide a portable type of process which can be quickly moved to the spot of contamination, assembled in a short period of time, and operated on site for such time as is necessary to remove and recover the contaminants from the soil.

The invention is illustrated in the FIGURE illustrating the unit operations which are carried out in schematic type of diagram showing conventional pieces of equipment which can be employed and satisfactorily skid mounted to make the process a mobile process.

DETAILED DESCRIPTION OF THE INVENTION

With particular reference to the FIGURE, the process in a preferred manner comprises first contacting the contaminated soil, which has been removed from the ground, with a solvent, for example a chlorinated solvent, by intimately mixing in any of the known manners the solvent and the soil and removing the soil which has been washed substantially free of contamination from the bulk of the solvent. The solid material, or soil, still wet with chlorinated solvent is passed to a dryer wherein hot air or other inert gas is contacted with the solid to remove the residual solvent. The vapors generated in this drying process are passed through filters and then combusted, burned or oxidized in a burner or incinerator. It is advantageous to generate steam from this burning process and use the steam to operate the heater for the air to the dryer and in many cases the steam production is sufficient to operate the later to be described distillation process for recovery of the bulk of the solvent. The combustion gases from the burner are quenched and washed with water to produce a aqueous, in the case of chlorinated hydrocarbon, hydrochloric acid. The strength of the acid of course depends upon the quantity of water which is used to wash the combustion gases. In the instance of, for example, using a chlorinated hydrocarbon solvent the acid produced on combustion is hydrogen chloride which upon contact with the wash water forms a aqueous hydrochloric acid solution. If the wash water is recirculated it is possible to build a rather concentrated solution of aqueous acid and this acid can be used in chemical processing. It is also possible to concentrate the aqueous acid by the normal convention of boiling away a portion of the water, which is then of course condensed and used to produce a part of the fresh water for the absorber. In any event, it is further to be understood that the hydrogen chloride for example, can be neutralized by contacting the wash water with an alkaline material, such as calcium carbonate or caustic soda. Thus there can be produced a substantially acid free solution again the product of the neutralization may be recovered through distillation of the water from the solids that are produced by the reaction thereby producing a very small volume of salt material which can be disposed of in a normal, reasonably safe manner. The noncondensable and nonabsorbable gases, such as carbon monoxide and carbon dioxide in the main and well as nitrogen from the air, are passed to a vent to the atmosphere.

The solvent from the first contacting and washing of the contaminated soil is collected and passed through the filters to a solvent recovery column or distillation column. The vapors of the solvent and any vaporizable contaminants are condensed and collected for return to the first step wherein they are used to wash the contaminated soil. The bottoms from the distillation column or recovery column are sent to a hold tank and may be further concentration by evaporation of solvent from the bottoms. It is to be understood that all solvent streams, vapor and liquid, which are not combusted are returned to the process to be used in the washing of the original contaminated soil and thus, through repeated use the vaporizable contaminants as well as the solid contaminants are removed from the soil and from the system as either combusted products or as solid materials which are greatly reduced in volume and can be handled in a safe and efficacious manner.

In the event certain organic containmants fall below the solvent boiling temperature both the solvent and contaminant can be recovered from residual soil then separated in a second distillation column, the lower boiling organic contaminant coming overhead and the solvent being the bottoms as a side stream. Of course with the use of a more complicated distillation column the lights can be taken overhead, the higher boiling taken as side streams and the soil taken in the bottoms.

In a detailed description of the present invention soil is removed from the contaminated area and placed in a hopper which empties into a spiral conveyor which moves the soil from, say for example, ground level to the top of a large hopper dryer device. During the passage of the soil up the spiral conveyer, it is conventional to wash the solids by introduction of the solvent, for example chlorinated solvent, near the top of the conveyor. The conveyor at this point is tightly sealed to the dryer assembly. The solvent, falling downward through the conveyor, is taken out at the bottom of the conveyor and passed to a dirty solvent collection tank. The solvent wet soil, substantially free of contaminants, is contacted with hot air in the dryer to remove the residual solvent remaining on the soil. The preferable form of the dryer is as a fluid bed thus giving rise to a more efficient utility of the heated air and reducing the volume of air necessary to remove the residual solvent. Periodically, or continuously depending on the amount of materials to be cleaned, the ceaned soil is removed from the dryer and stacked and/or returned to the diggings replacing the contaminated soil that has been removed. The air vapor mixture from the dryer is passed through filters such that the major portion of any vaporizable contaminants or small micronic size contaminants which pass out of the dryer with the air vapor mixture, are collected and are capable of being recovered and removed from the area in the filter itself. The vapors and the air along with any volatilizable contaminants are passed to an incinerator or burner where, under high temperature and sufficient air and oxygen added to support the combustion to substantially complete combustion, preferably in the case of chlorinated hydrocarbons, carbon dioxide and HCl generates sufficient heat to produce steam which is used to heat the air and to heat the distillation column to be further described. The gases from the burner are quenched with water which may be a recyclable stream from the next stage which is the absorber. The gases which leave the quencher are then treated with water in a column wherein the absorbable or dissolvable gases are dissolved in the water and carried out to be treated either with caustic and alkali or to be further condensed by evaporation of the water. In this event the water, of course, is returned to the absorber washing column. The noncondensable gases, any carbon monoxide, the carbon dioxide and of course the nitrogen that was not combusted in the burner are passed to a vent to the atmosphere.

The dirty solvent is passed to a holding tank in which it is continuously recirculated and a portion taken out and passed through filters. Again, the solid micronic size particles are removed and the solvent passes to the top or some point in a solvent distillation column. The purpose, of course, of the distillation column is to separate the solvent from any organic material which it picked up during the decontamination process. Normally, these organic materials have a different boiling point than the solvent and are capable of being separated and concentrated from the distillation columns. The solvent vapors in the instance of a higher boiling organic material come overhead and are passed through a condenser, a portion of them recycled and the remainder, the bulk of the condensed solvent, passed to a holding tank where they are reused to wash the contaminated soil in the first step. The bottoms from the distillation column are removed and placed in a holding tank. These solids, being a flowable material, can be further concentrated by evaporation such as in a steam evaporator, dried as in the drier or, if they are not toxic and can be satisfactorily combusted, for example they can be used as feed for the burner thus producing additional steam and condensable or noncondensable gases and the former being collected in the waste from the wate absorbers.

It is thus seen there is described a process in which a contaminated soil is freed of its contaminants and the solvent used to free and wash the contaminated soil is collected and reused and/or it is combusted and removed from the system in a form which will not contaminate the ambient atmosphere. All portions of this equipment are substantially gas tight and liquid tight and therefore eliminate or markedly reduce any further contamination of the ambient atmosphere with the contaminants found in the soil.

I claim:

1. A process for decontaminating soil which comprises contacting the contaminated soil with a solvent for said contaminants in an intimate manner;

separating said soil from the bulk of said solvent;

treating said separated solvent and its concomitent solids by filtration; recovering the solids wet with solvent and the bulk of the solvent as a filtrate;

subjecting the filtrate to distillation to recover a substantially contaminant free solvent and reusing said so obtained solvent as at least a part of said solvent first contacting said contaminated soil;

freeing said solvent wet solids from solvent and combining said filtrate prior solvent with said feed to said solvent distillation step;

treating said solvent washed soil with an inert gas to strip the residual solvent from said soil and recovering decontaminated soil; and optionally treating said inert gas strip and generated solvent vapors by filtration and burning said resulting filtrate thereby generating burned filtrate gases; and washing said burned filtrate gases to recover inorganic oxides and acids.

2. A process for decontaminating soil which comprises contacting the contaminated soil with a solvent for said contaminants in an intimate manner;

separating said soil from the bulk of said solvent;

treating said separated solvent and its concomitent solids by filtration; recovering the solids wet with solvent and the bulk of the solvent as a filtrate;

subjecting the filtrate to distillation to recover an overhead of substantially contaminant free solvent and reusing said so obtained solvent as at least a part of said solvent first contacting said contaminated soil;

freeing said solvent wet solids from solvent and combining said filtrate prior solvent with said feed to said solvent distillation step;

treating said solvent washed soil with air to strip the residual solvent from said soil and recovering decontaminated soil;

treating said air strip and generated solvent vapors by filtration and burning said resulting filtrate thereby generating burned filtrate gases; and washing said burned filtrate gases to recover inorganic oxides and acids.

* * * * *

UNITED STATES PATENT AND TRADEMARK OFFICE
CERTIFICATE OF CORRECTION

PATENT NO. : 4,606,774

DATED : August 19, 1986

INVENTOR(S) : Thomas E. Morris

It is certified that error appears in the above-identified patent and that said Letters Patent is hereby corrected as shown below:

Col. 3, line 47 "Containmants" should read -- Contaminants --.

Col. 4, line 61 "wate" should read --water--.

Col. 5, line 20 should read --freed solvent with said filtrate prior-- instead of "filrate prior solvent with said feed"; line 24 delete "and optionally".

Col 6, line 17 should read --freed solvent with said filtrate prior-- instead of "filrate prior solvent with said feed".

Signed and Sealed this

Sixteenth Day of February, 1988

Attest:

DONALD J. QUIGG

Attesting Officer

Commissioner of Patents and Trademarks